United States Patent [19]

Sterzel

[11] Patent Number: 4,828,941
[45] Date of Patent: May 9, 1989

[54] METHANOL/AIR FUEL CELLS

[75] Inventor: Hans-Josef Sterzel, Dannstadt-Schauernheim, Fed. Rep. of Germany

[73] Assignee: BASF Aktiengesellschaft, Ludwigshafen, Fed. Rep. of Germany

[21] Appl. No.: 51,453

[22] Filed: May 19, 1987

[51] Int. Cl.[4] .............................................. H01M 8/10
[52] U.S. Cl. ........................................ 429/33; 429/40; 429/43
[58] Field of Search ................... 429/30, 33, 46, 40, 429/42

[56] References Cited

U.S. PATENT DOCUMENTS

| | | | |
|---|---|---|---|
| 2,913,511 | 11/1959 | Grubb, Jr. ............................. | 429/30 |
| 3,198,666 | 8/1965 | Gruneberg et al. ................ | 429/30 X |
| 3,483,036 | 12/1969 | Gregor .................................. | 429/30 |
| 4,116,889 | 9/1978 | Chlanda et al. ....................... | 521/27 |
| 4,390,603 | 6/1983 | Kawana et al. ....................... | 429/30 |
| 4,478,917 | 10/1984 | Fujita et al. .......................... | 429/33 |

FOREIGN PATENT DOCUMENTS 0154247  6/1984  European Pat. Off. .
3407719  7/1985  Fed. Rep. of Germany .

OTHER PUBLICATIONS

Wanatabe et al., J. Electroanal. Chem. 199 (1986), 311.
Wanatabe et al., J. Electroanal. Chem. 193 (1985), 319.
Furaya et al., J. Electroanal. Chem. 179 (1984), 303.
Rohlen et al., Macromol. Chem. Rapid Commun. 1 (1980), 753–758.

Primary Examiner—Anthony Skapars
Attorney, Agent, or Firm—Oblon, Fisher, Spivak, McClelland & Maier

[57] ABSTRACT

Methanol/air fuel cells consisting of
(A) a cathode,
(B) an anode and
(C) A $CO_2$-permeable anion exchanger membrane as the electrolyte.

14 Claims, 1 Drawing Sheet

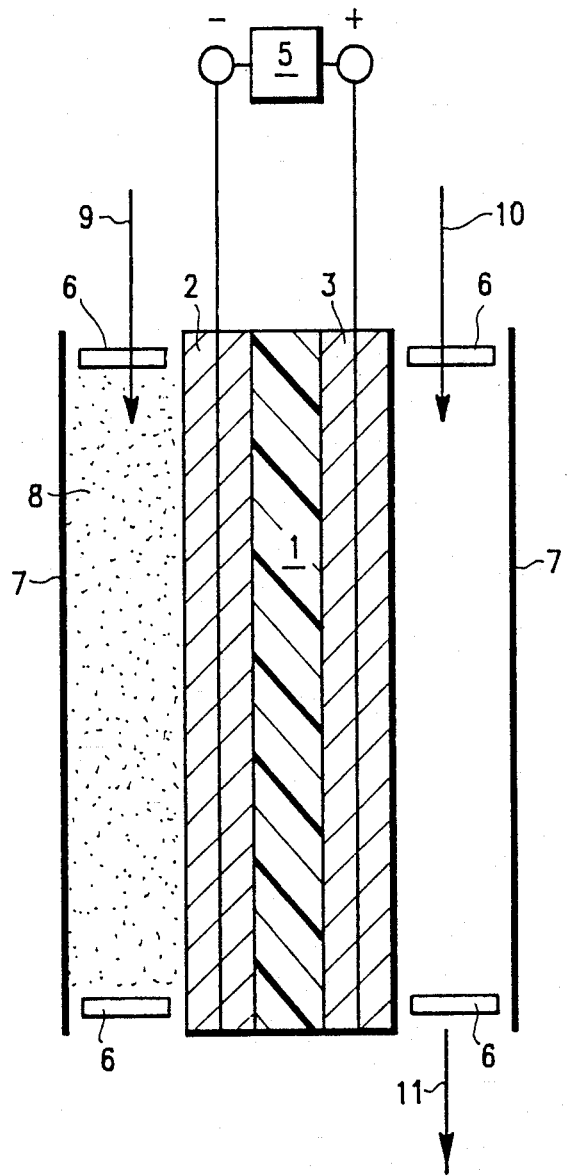

METHANOL/AIR FUEL CELLS

BACKGROUND OF THE INVENTION

The present invention relates to methanol/air fuel cells.

DISCUSSION OF THE BACKGROUND

Fuel cells are cells which continuously convert the chemical energy change of a fuel oxidation reaction into electrical energy. At the anode, fuel molecules are oxidized with donation of electrons, while at the cathode the oxidant is reduced with acceptance of electrons. The ions formed at the anode and the cathode migrate in the electrolyte and combine there to form a reaction product, completing the electric circuit.

From the point of view of thermodynamic efficiency, such fuel cells constitute the most advantageous method for the direct conversion of fuel to electrical energy.

The most well known fuel cells are those which operate with gaseous fuels, mainly hydrogen, and with a gaseous oxidant, preferably oxygen.

Because of the gaseous fuels and oxidants, cells of this type present certain problems with regard to sealing and the feeding of the fuels and oxidants and their storage. Furthermore, leakage through the partition between the hydrogen side and the oxygen side results in complete failure of the system.

Attempts have therefore been made to develop fuel cells using liquid fuels and atmospheric oxygen as the oxidant.

Methanol is a preferred liquid fuel since it has sufficient electrochemical activity at the operating temperatures, no special cleaning is required and furthermore storage presents no problems. Moreover, methanol can be produced economically on a large industrial scale from oil, natural gas or coal.

In methanol/air fuel cells of this type, certain specific problems arise during operation.

A substantial disadvantage is the formation of carbon dioxide as an oxidation product of the methanol at the anode. Since carbon dioxide is insoluble or only very slightly soluble in the acidic electrolytes usually used, such as sulfuric acid or phosphoric acid and in the cation exchanger membranes used as a solid electrolyte, gaseous carbon dioxides is evolved at the anode. This leads to an overvoltage at the anode, having an adverse effect on the efficiency of the fuel cell. Furthermore, carbon dioxide enters the feeds and the storage containers for the methanol.

J. Elektroanal. Chem., 199 (1986), 311-322 proposes solving this problem by expelling the carbon dioxide in gaseous form. However, the carbon dioxide separated off is saturated with methanol vapor and therefore cannot be released into the environment without further purification. Removal of the methanol by means of absorbents, by freezing out or with membranes which are selectively permeable to carbon dioxide in particular is so expensive and energy-consumptive that, for economic reasons, constructions of this type are unsatisfactory.

Another problem which to data has been solved only by very expensive means arises in particular in fuel cells in which ion exchange membranes are used as a solid electrolyte. It is known that these membranes are used in a moist state and, for appropriate operation, the water content must be kept substantially constant.

During operation of the fuel cells, hydrogen ions ($H^+$ ions) are formed at the anode and hydroxyl ions ($OH^-$ ions) are formed at the cathode. However, only hydrogen ions are mobile in the cation exchanger membrane, ie. ion transport and flow of current within the cell can be effected only by means of hydrogen ions, which diffuse through the membrane serving as an electrolyte, from the anode to the cathode, where they react with the hydroxyl ions to form water. Migration of hydroxyl ions through the anion exchanger membrane can take place only to a very limited extent, owing to the fact that the hydroxyl ions have the same types of charge as the solid ions bound in the membrane.

The hydrogen atoms diffusing through the membrane carry on average 4 water molecules per hydrgen ion as a hydrate shell during their migration. As a result, the membrane loses water on the anode side and dries out in the course of time, while an excess of water is present on the cathode side. In order to ensure correct operation, the membrane must have a constant water content, which can only be achieved by controlled admixing of water on the anode side. This too requires expensive feed units.

SUMMARY OF THE INNVENTION

It is an object of the present invention to provide a methanol/air fuel cell which avoids the above disadvantages and at the same time is simple and economical to produce and has a long life.

We have found that this object is achieved, according to the invention, by a methanol/air fuel cell consisting essentially of (A) a cathode, (B) an anode and (C) a $CO_2$ permeable anion exchange membrane as an electrolyte.

BRIEF DESCRIPTION OF THE FIGURE

The invention is explained below in the detailed description and by the attached FIGURE.

FIG. 1 shows the principle of construction of a methanol/air fuel cell according to the invention.

DETAILED DESCRIPTION OF THE PREFERRED EMBODIMENTS

As discussed above, the present invention provides methanol/air fuel cell consisting essentially of (A) a cathode, (B) an anode, and (C) a $CO_2$ permeable anion exchanger membrane as an electrolyte.

In a preferred embodiment of this methanol/air fuel cell the cathode (A) and/or the anode (B) are porous gas diffusion electrodes in which the catalyst forms a percolation network within the pores.

In another preferred embodiment of this methanol/air fuel cell the cathode (A) and/or the anode (B) contain a layer of anion exchanger polymer.

In another preferred embodiment of this methanol/air fuel cell the cathode (A) contains, as the catalytic component, a Co(salene) compound of the formula I or a polymer containing this compound:

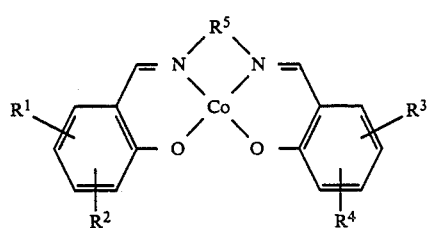 (I)

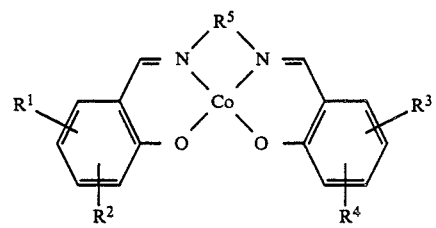

In another preferred embodiment of this methanol/air fuel cell the anion exchanger membrane (C) consists of a base polymer having a glass transition temperature for more than 80° C., and the ionic groups are separated from the main chain by not less than 4 carbon atoms.

The cathodes known per se for methanol/air fuel cells and described by, for example, A. Winsel, Ullmanns Enzyklopadie der technischen Chemie, 4th edition, volume 12, page 113 et seq. can be used as cathode (A) in the novel fuel cells.

High current densities can be achieved in particular using porous, gas-permeable electrodes. The gas permeability is advantageous since, during operation of the fuel cell, oxygen diffuses into the cathode and water and carbon dioxide diffuse out.

Such gas diffusion electrodes are described by, for example, Watanabe et al. (J. Electroanal. Chem. 183 (1985), 391–394). These electrodes are produced by sintering carbon black together with carbon black particles covered with catalyst, and if required polytetrafluoroethylene particles, around a suitable conductor. The resulting electrode consists of a porous network in which the catalyst particles are in contact with one another, forming a percolation network.

A percolation network is understood as meaning that there is a permanent connection between the catalyst particles, ie. the said particles are in contact with one another.

Catalysts usually employed for reducing the oxygen are noble metals, such as platinum, silver or nickel, to mention but a few.

More economical electrodes, in which the use of expensive noble metals is avoided, can be produced from special membranes, as described in EP-A 154 247.

To produce a cathode from the membranes described there, a close-meshed wire net, in particular one consisting of stainless steel or copper, is preferably used as a conductor. The mesh sizes are as a rule from 0.02 to 0.5 mm and the free area is not less than 20% of the total area. This conductor is then coated with a noncrosslinked polymer, as described in EP-A 154 247.

These polymers contain Co(salene) groups covalently bonded to the polymer chain.

For the purposes of the present invention, Co(salene) compounds are the compounds described in EP-A 154 247, of the general formula I where $R^1$, $R^2$, $R^3$ and $R^4$ are each hydrogen, methyl, methoxy, fluorine or trifluoromethyl and $R^5$ is the divalent substituent —$CH_2$—$CH_2$— or a divalent phenyl radical.

Particularly preferred compounds are those in which $R^1$, $R^2$, $R^3$ and $R^4$ are each hydrogen and $R^5$ is the divalent ethylene group (—$CH_2$—$CH_2$—).

Processes for the preparation of such polymers, and membranes containing these polymers, are described in EP-A 154 247, so that further information is unnecessary here.

Polymers of this type preferably consist of from 10 to 100 mol % of units derived from vinylpyridines and, if desired, from 0 to 90 mol % of units derived from vinyl monomers. Examples of monomers of this type are styrene and p-methylstyrene.

In addition to the polymers described in EP-A 154 247, the polymers described by Bohlen et al. (Makromol. Chem. Rapid Commun. 1 (1980), 753–758) are also suitable as the catalytic component of the cathodes.

The conductor net used as a conductor in the embodiment described above can advantageously be coated by dissolving the polymers in suitable polar solvents, such as tetrahydrofuran, dimethylformamide, N-methylpyrrolidone, pyridine or dimethyl sulfone, and immersing the conductor net in this polymer solution. Care should be taken to ensure that the meshes of the net used as the conductor are not closed by the polymer solution.

Instead of the polymers which contain the Co(salene) units covalently bonded to the polymer chain, it is also possible to use vinyl polymers in whose solution low molecular weight compounds which are capable of accepting and transporting molecular oxygen and of catalyzing the reduction of the oxygen are used.

Examples of suitable vinyl polymers are those stated above and described in EP-A 154 247.

The amount of Co(salene) compounds in the solution of the polymersis in general from 5 to 80, preferably from 10 to 50%, by weight, based on the total weight of the polymer and the Co(salene) compound.

Cathodes containing such catalytic components for the reduction of oxygen can be produced by immersing the conductor in a solution of the polymer and the Co(salene) compound, as in the embodiment described above. Evaporation of the solvent results in the Co(salene) compound crystallizing out in the form of a percolation network.

However, the polymeric compounds described above can be used not only for coating conductor nets but also for coating conventional porous electrodes, in which they then likewise constitute the catalytic component required for reduction of oxygen. In principle, any porous cathodes for methanol/air fuel cells, as known from the prior art, can be used for this purpose.

Cathodes based on water-wettable carbon black and polytetrafluoroethylene particles are preferably used for coating.

The following procedure can be adopted for the production of such coated electrodes.

Carbon black having a high specific surface area (for example from 200 to 500 m$^2$/g) is rendered water-wettable by oxidation in air at about 600° C. followed by treatment with boiling nitric acid. This carbon black is then impregnated with a dilute solution of the polymer and Co(salene) compound, dried, mixed thoroughly with polytetrafluoroethylene powder and pressed around an appropriate conductor at from 150° to 200° C. in such a way that open micropores and channels are retained.

Porous cathodes in which a layer of an anion exchanger polymer has been deposited have proven particularly advantageous. This layer is in general from 0.01 to 1 μm, preferably from 0.05 to 0.5 μm, thick and its composition may be similar to or different from that of the anion exchanger membrane (C) used as the solid electrolyte.

Appropriate anion exchanger polymers are known per se and are described in the literature, so that no further information is required here.

Coated cathodes of this type can be particularly readily prepared by impregnating the porous electrode with a solution of the base polymer, then removing the solvent and finally adding a dilute solution of the component which forms the ionic groups.

Examples of suitable base polymers are copolymers of vinylbenzyl chloride with styrene or other copolymerizable monomers, such as ethylene glycol methacrylate or vinylpyridines, and polyvinyl chloride.

For the coating procedure, the porous electrode can be impregnated with a solution of these polymers, for example in tetrahydrofuran, dimethylformamide, dichloromethane or methyl ether ketone, and the solvent is then evaporated. For crosslinking and forming the ionic groups, a dilute solution of a polyamine, for example diethylenetriamine or tetraethylenepentamine, can then be added, and crosslinking and formation of the ionic groups at the nitrogen (quaternization) can be effected by heating for from 20 to 50 hours at from 20° to 120° C., in particular from 30° to 60° C.

Coating with the anion exchanger polymer can be carried out directly after the electrodes have been coated with the catalytically active polymers as described above, by adding the base polymer of the anion exchanger polymer to the solution of the catalytic components, sintering the electrode and then carrying out crosslinking and formation of the ionic groups with the aid of the polyamine.

In another procedure, instead of solutions of the anion exchanger polymer, corresponding dispersions are used as starting materials. Thus, with the aid of emulsion polymerization, it is possible, for example, to prepare aqueous dispersions of copolymers of vinylbenzyl chloride and to effect quaternization by reaction with amines or polyamines. The preparation of aqueous dispersions of anion exchanger polymers is described in, for example, U.S. Pat. No. 4,116,889.

If such a dispersion of an anion exchanger polymer is allowed to act on that side of the cathode which faces away from the air, the anion exchanger polymer also accumulates at that side of the cathode which faces the membrane.

By coating the porous cathode with the anion exchanger polymers, particularly good coupling of the cathode to the anion exchanger membrane used as the solid electrolyte is obtained and hence the contact resistances, diffusion resistances and therefore overvoltages are reduced; this has an advantageous effect on the overall efficiency.

Other suitable anodes (B) are the anodes, for methanol/air fuel cells, which are known per se from the prior art and described in the literature. In the electrodes available at present, it is still not possible to dispense with a noble metal as a catalyst for the oxidation of the hydrogen.

Examples of suitable catalysts are pure platinum and mixed catalysts based on platinum/ruthenium or platinum/tin, which have a higher activity than pure platinum catalysts and lead to lower overvoltages.

Processes for the production of such anodes are known per se and are described in the literature (for example in J. Electroanal. Chem. 179 (1984), 303 and loc. cit. 199 (1986)311).

Particularly active anodes are obtained if carbon black having a high specific surface area of from 100 to 400 m$^2$/g is used as the carrier for the catalyst.

An anode containing a mixed catalyst based on platinum/ruthenium is obtained, for example, by the method described in J. Electroanal. Chem. 179 (1984), 303–306, by treating carbon black with a solution of RuCl$_3$ in isopropanol/water, heating to 120° C., and carrying out a reduction with hydrogen at 200° C. to precipitate the ruthenium. This treatment is then repeated with a solution of hexachloroplatinic acid (H$_2$PtCl$_6$), and the platinum thus precipitated. The carbon black activated with the catalyst can then be mixed with further carbon black and a polytetrafluoroethylene dispersion.

Particularly preferably used polytetrafluoroethylene particles are those having a median diameter d$_{50}$ of from 0.05 to 0.8 μm, preferably from 0.1 to 0.4 μm. The median diameter d$_{50}$ is the diameter where 50% by weight of the polytetrafluoroethylene particles have smaller diameters and 50% by weight have larger diameters.

Electrodes having a particularly high mechanical load-bearing capacity are obtained if the powders described above are formed into a bed around the conductor and sintered initially at room temperature and then under pressure (3–7 kp/cm$^2$) and at high temperatures (300°–400° C.). This sintering process gives electrodes which have a high mechanical load-bearing capacity and in which the catalyst particles are in contact with one another and thus form a percolation network.

It should be ensured that the porosity of the electrode is sufficient to permit easy penetration by methanol and water.

Particularly advantageous anodes are obtained if the porous electrodes are coated with an anion exchanger polymer to facilitate transport of material and charge. Coating can be carried out using the methods already described for coating of the catalyst.

The novel methanol/air fuel cells contain an anion exchanger membrane as a solid electrolyte, this being an essential component of the said cells.

In contrast to the prior art cation exchanger membranes as solid electrolytes, transport of current in the novel methanol/air fuel cells takes place through migration of the hydroxyl ions, which are formed at the cathode, to the anode. During their migration, the hydroxyl ions carry a solvate shell of water molecules into the anode space. On the cathode side, the water is removed continuously by the air stream fed past the cathode. As a result, a concentration gradient of water is formed from the anode side to the cathode side, and is compensated by virtue of the fact that water migrates from the anode side to the cathode side. This compensates the loss on the cathode side and a uniform water content on the cathode and anode sides is obtained, with the result that additional measures for moistening the membrane at one electrode side are superfluous.

The hydrogen ions formed at the anode cannot penetrate far into the anion exchanger membrane, and form a space charge cloud around the anode.

The carbon dioxide formed at the anode during oxidation of the methanol reacts with the hydroxyl ions diffusing from the cathode side to form bicarbonate ($HCO_3^-$ ions), suppressing the formation of gaseous carbon dioxide and reducing the associated overvoltage. By applying an excess static pressure to the methanol used as fuel, the formation of gaseous carbon dioxide can be virtually completely suppressed.

Because of the concentration gradient and the electrostatic field, the bicarbonate ions migrate within the anion exchanger membrane from the anode to the cathode, where they dissociate into hydroxyl ions and carbon dioxide, owing to the low carbon dioxide partial pressure there.

The carbon dioxide is removed in gaseous form with the stream of air fed past the cathode.

Suitable anion exchanger membranes are virtually any commercial membrane whose solid ion content is preferably from 0.5 to 5 equivalents per kg of dry membrane.

Suitable base polymers for such anion exchanger membranes are, for example, copolymers which are obtainable by grafting vinylpyridines onto polytetrafluoroethylene or by chloromethylation of polystyrene crosslinked with divinylbenzene, followed by quaternization with tertiary amines. Copolymers of vinylbenzyl chloride and divinylbenzene are also suitable. To produce the ionic groups capable of anion exchange, these polymers are reacted with appropriate monomers, for example with trialkylamines or multifunctional amines. Examples of suitable multifunctional amines are diethylenetriamine and tetraethylenepentamine.

Other suitable base polymers are polyvinyl chloride films appropriately modified by reaction with amines.

Particularly preferred anion exchanger membranes are those whose ionic groups are separated from the main chain by not less than 4 carbon atoms and in which the main chain consists of an aromatic polymer which has a glass transition temperature of more than 80° C. Such membranes and processes for their preparation are described in detail in DE-A No. 34 07 719, so that further information is unnecessary here.

In a particular embodiment, an additional anion exchanger membrane can be dispensed with if one or more of the inward-facing electrode surfaces are coated with a homogeneous layer of anion exchanger polymers which acts as an electrolyte.

Finally, the structure of a novel methanol/air fuel cell is illustrated schematically in the attached FIG. 1.

An anion exchanger membrane 1 which is used as a solid electrolyte, an anode 2 and a cathode 3 are pressed directly against one another. The anode and the cathode are each provided with a conductor 4. The energy produced is removed via an external consumer 5. The methanol used as the fuel is fed into the anode space via the methanol feed 9, and the air used as an oxidant is fed into the cathode space via the air feed 10. In the embodiment shown, the supporting grid provided on the anode side is mounted between the anode 2 and the partition 7 to the next cell. Spacers 6 ensure that an appropriate cathode or anode space is available. The reaction products formed, in the present case water, carbon dioxide and nitrogen, are removed via an outlet 11.

During operation of the fuel cell, carbon dioxide and hydrogen ions are formed at the anode 2 by oxidation of methanol, in accordance with the equation

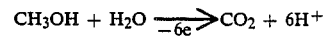

At the cathode 3, reduction of the oxygen present in the air gives $OH^-$ in accordance with

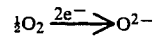

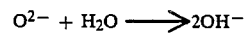

The $OH^-$ ions formed at the cathode migrate through the anion exchanger membrane to the anode, where they react with the hydrogen ions formed there to give water. At the same time, the carbon dioxide formed at the anode reacts with the $OH^-$ ions to give bicarbonate ions ($HCO_3^-$).

Depending on the concentration gradient, the bicarbonate ions, and the water formed at the anode, migrate through the anion exchanger membrane to the cathode. At the cathode, the bicarbonate ions decompose into $OH^-$ ions and carbon dioxide, which emerges into the stream of air fed past the cathode and is thus removed from the cell without special apparatuses being required for this purpose. The water formed during the reaction is also removed together with the air stream fed past the cathode.

The above description of the FIGURE shows that the novel methanol/air fuel cells are distinguished by a simple construction and at the same time the operational problems familiar in the prior art do not arise.

The fuels and the oxidant can be fed in very simply by means of a pump or a fan.

EXAMPLE (a) Preparation of an Anion Exchanger Polymer

The anion exchanger polymer was prepared by Friedel-Crafts acylation of polyether sulfone with 6-chlorohexanecarbonyl chloride, followed by catalytic reduction of the carbonyl group and quaternization with trimethyl-amine, as described below.

232 g of a polyether sulfone prepared by polycondensation of 4-hydroxy-4'-hydroxy-4'-chlorodiphenyl sulfone and having a relative viscosity of 1.7, measured in 1% strength by weight solution in N-methylpyrrolidone were dissolved in 2 l of 2-nitropropane. 85 g of 6-chlorohexanecarbonyl chloride were dissolved in this solution. A solution of 70 g of aluminum trichloride ($AlCl_3$) in 300 ml of 2-nitropropane was added to the resulting solution in the course of about 1 hour at from 15° to 20° C. while stirring and cooling, and the mixture was then stirred for a further 12 hours. Thereafter, the reaction solution was introduced into a 1:1 mixture of methanol and ice water, and the precipitated polymer was washed several times with methanol, dried and dissolved in chloroform. To reduce the carbonyl group, 38 g of lithium aluminum hydride ($LiAlH_4$) were dissolved in 600 ml of methyl tert-butyl ether, and a solution of 290 g of $AlCl_3$ in methyl tert-butyl ether was slowly added to this solution. The solution of the polymer in chloroform was added to this mixture, and stirring was continued for 3 hours at room temperature.

About 1 l of 15% strength by weight HCl was then slowly added to the mixture thus obtained, and stirring was continued. The polymer present in the organic phase was precipitated in methanol and dried. The yield was 283 g and the chlorine content 1.54 equivalents/kg. 250 g of the polymer were dissolved in 1.5 l of dimethylformamide, and about 150 g of trimethylamine were passed into the stirred solution at room temperature. Stirring was continued for 12 hours, after which the excess trimethylamine was distilled off, the temperature being increased to 70° C. The resulting solution of the anion exchanger polymer in dimethylformamide was used as described below. It contained 1.5 equivalents of $^+N(CH_3)_3$ ions per kg of solid polymer.

(b) Preparation of the Polymeric Catalyst for the Cathode

2-Hydroxy-5-vinylbenzaldehyde was prepared by the process due to Wulff et al. (Makromolekulare Chemie, 179 (1979), 2647) by chloromethylation of salicylaldehyde, reaction of the 5-chloromethylsalicylaldehyde with triphenylphosphine and conversion of the phosphonium salt to the desired compound.

1. 73 g (1 mole) of tert-butylamine were added to a solution of 74 g (0.5 mole) of 2-hydroxy-5-vinylbenzaldehyde in 750 ml of toluene, and this mixture was refluxed for 2 hours. After extraction with twice 500 ml of ice water, the toluene was distilled off. 80 g (79%) of 2-butylaminomethyl-4-vinylphenol were obtained as a yellow oil.
2. 80 g of 2-butyliminomethyl-4-vinylphenol, 42 g of 4-vinylpyridine and 21 g of styrene were dissolved in 1200 ml of ethylbenzene, the mixture was heated to 80° C., 100 mg of 2,2'-azoisobutyronitrile were added and the mixture was then stirred under nitrogen for 24 hours. The polymer was obtained by precipitation with methanol. Redissolution in dimethylformamide and precipitation in methanol gave 122 g (85%) of a yellowish polymer.
3. 20 g of the polymer thus obtained in a mixture of 400 ml of water, 400 ml of ethanol and 80 ml of sulfuric acid were refluxed for 3 hours in order to eliminate the tert-butylamine acting as a protective group. 16.8 g of a polymer (aldehyde copolymer) were recovered.
4. 16 g of the resulting copolymeric aldehyde were refluxed with 20 ml of ethylenediamine in 300 ml of toluene for 24 hours. The polymeric Schiff's base formed was precipitated in methanol, filtered off and dried under reduced pressure. 18.3 g of the polymeric Schiff's base were obtained.
5. 18.0 g of the polymeric Schiff's base were dissolved in 300 ml of toluene, 10 g of salicylaldehyde were added and the mixture was then refluxed for 24 hours. The yellow polymer precipitated was extracted with methanol. 19.3 g of the polymer were obtained.
6. A mixture of 19 g of the polymer from stage 5 and 14 g of cobalt(II) acetate.$4H_2O$ in 700 ml of oxygen-free dimethylformamide was heated for 24 hours at 80° C. The coordination polymer thus obtained was extracted with ethanol under nitrogen. The yield was 17.6 g.

(c) Production of the Cathode 50 parts by weight of a carbon black which had a mean primary particle diameter of about 50 nm and was rendered water-wettable by oxidation in air at 600° C. for several hours and boiling in concentrated nitric acid were mixed with 50 parts by weight of polytetrafluoroethylene powder (mean particle size 200 nm) in a colloid mill. A nickel-plated, square copper wire net having a wire thickness of 0.2 mm, a mesh size of 0.4 mm and an edge length of 50 mm was used as the conductor. The edges were surrounded on all sides by a 0.8 mm thick copper frame. The carbon black/PTFE mixture was suspended in a mixture of 1 part by volume of water and one part by volume of methanol, and the suspension was spread over the conductor net. To achieve good contact, the suspension was rolled onto the said net by means of a roller. The net thus obtained was dried, and an electrode about 0.8 mm thick was produced in a compression mold, initially at room temperature and then at 360° C. under a pressure of about 50 $N/cm^2$. This electrode was impregnated with a solution of 5 g of the polymeric catalyst (as described under (b)) in 100 ml of dimethylformamide, and the dimethylformamide was removed by heating to 150° C.

The electrode was impregnated with methanol and then coated on one side with a 15% strength solution of the anion exchanger polymer (as described under (a)) in dimethylformamide.

The prior impregnatin with methanol served to coagulate the solution of the anion exchanger polymer and hence to prevent complete blocking of the pores of the electrode. Careful evaporation of the solvent gave a cathode which was coated on one side with the anion exchanger polymer but was open-pored on the opposite side. The thickness of the coating was about 0.1 mm.

(d) Production of the Anode

As stated in (c), an electrode consisting of water-wettable carbon black, polytetrafluoroethylene and a nickel-plated copper conductor was produced by sintering in a compression mold. The catalyst used was a mixed system consisting of tin and a small amount of platinum. The electrode was first impregnated with a 10% strength by weight solution of tin(IV) chloride in isopropanol and dried at 120° C., after which the tin(IV) chloride was reduced with hydrogen at 200° C. in an oven. The amount of tin present was about 15 $mg/cm^2$. The electrode was then impregnated with an aqueous solution of hexachloroplatinic acid ($H_2PtCl_6$), and the platinum was prepared from this by reduction with hydrogen. The amount of platinum present was 0.3 $mg/cm^2$. Finally, a layer of the anion exchanger polymer was applied to one side of the resulting anode by a method similar to that described in (c), the layer being about 0.0 mm thick.

(e) Production of the Fuel Cell and the Cell Output

Before assembly of the cell, the anode and cathode were stored for 24 hours in an atmosphere saturated with water vapor, in order to swell the anion exchanger polymer.

During assembly, those sides of the electrodes which were coated with the anion exchanger polymer were brought together under pressure, using springs and support material. The anode chamber was filled with methanol, while filtered air flowed through the cathode space.

The open-circuit voltage of the cell was 1.20 V; with a current drain of 1 A/cm$^2$, the voltage dropped to 0.98 V.

We claim:

1. A methanol/air fuel cell consisting of
(A) a cathode,
(B) an anode and
(C) a CO$_2$-permeable anion exchange membrane as an electrolyte, wherein said membrane is made of a base polymer, said base polymer being a copolymer obtained by grafting vinyl pyridine onto polytetrafluoroethylene or by chloromethylation of polystyrene crosslinked with divinylbenzene, or a copolymer of vinylbenzylchloride and divinylbenzene, or a polymer of vinylchloride, wherein said polymer or copolymer is modified with an amine; and
(D) as a fuel, a methanol/air mixture.

2. A methanol/air fuel cell as claimed in claim 1, wherein the cathode (A) and/or the anode (B) are porous gas diffusion electrodes in which the catalyst forms a percolation network within the pores.

3. A methanol/air fuel cell as claimed in claim 1, wherein the cathode (A) and/or the anode (B) contain a layer of anion exchanger polymer.

4. A methanol/air filter cell as claimed in claim 1, wherein the cathode (A) contains, as the catalytic component, a Co(salene) compound of the formula I or a polymer containing this compound:

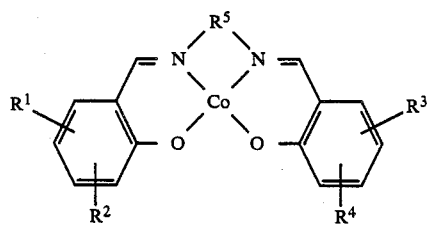

wherein:
R$^1$, R$^2$, R$^3$ and R$^4$ are each independently by hydrogen, methyl, methoxy, fluorine or trifloromethyl; and
R$^5$ is —CH$_2$CH$_2$— or a divalent phenyl radical.

5. A methanol/air fuel cell as claimed in claim 1, wherein the anion exchanger membrane (C) consists of a base polymer having a glass transition temperature of more than 80° C., and the ionic groups are separated from the main chain by not less than 4 carbon atoms.

6. A methanol/air fuel cell, comprising:
(A) a cathode;
(B) an anode;
(C) a CO$_2$ permeable anion exchange membrane as an electrolyte; wherein said membrane is made of a base polymer, said base polymer being a copolymer obtained by grafting vinyl pyridine onto polytetrafluoroethylene or by chloromethylation of polystyrene with divinylbenzene, or a copolymer of vinylbenzylchloride and divinylbenzene, or a polymer of vinyl chloride, wherein said polymer or copolymer is modified with an amine,
(D) as a fuel, a methanol/air mixture; and
(E) means for removing H$_2$O and CO$_2$ from the cathode region of said fuel cell.

7. The methanol/air fuel cell of claim 6, wherein said cathode, or said anode, or both said cathode and said anode are porous gas diffusion electrodes in which a catalyst forms a percolation network within the pores of said electrode.

8. Th methanol/air fuel cell of claim 6, wherein said cathode, or said anode, or both said cathode and said anode contain a layer of anion exchange polymer.

9. The methanol/air fuel cell of claim 6, wherein the cathode contains, as a catalytic component, a Co(salene) compound of formula (I) or a polymer containing said Co(salene) compound of formula (I):

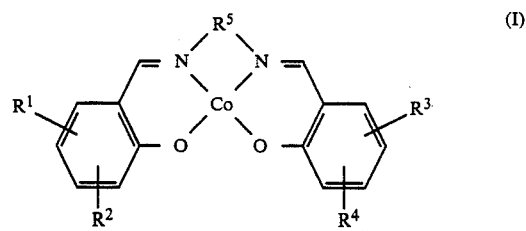

wherein:
R$^1$, R$^2$, R$^3$ and R$^4$ are each independently hydrogen, methyl, methoxy, fluorine or trifluoromethyl; and
R$^5$ is —CH$_2$—CH$_2$— or a divalent phenyl radical.

10. The methanol/air fuel cell of claim 6, wherein said anion exchange membrane consists essentially of a base polymer having a glass transition temperature of more than 80° C., said base polymer containing ionic groups separated from the main chain of said polymer by not less than 4 carbon atoms.

11. The methanol/air fuel cell of claim 9, wherein R$^1$, R$^2$, R$^3$ and R$^4$ are each hydrogen and R$^4$ is —CH$_2$—CH$_2$—.

12. The methanol/air fuel cell of claim 6, comprising a means for feeding a stream of air adjacent to said cathode.

13. The fuel cell of claim 1, wherein said anion exchange membrane is a membrane whose ionic groups are separated from the main chain by not less than 4 carbon atoms and in which the main chain consists of an aromatic polymer which has a glass transition temperature of more than 80° C.

14. The fuel cell of claim 13, wherein the cathode (A) contains, as the catalytic component, a Co(salene) compound of the formula I or a polymer containing this compound

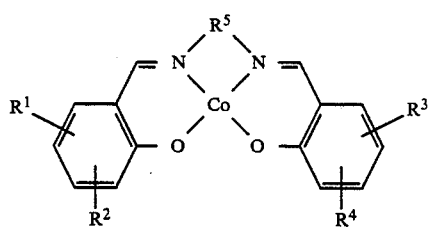

wherein:
R$^1$, R$^2$, R$^3$ and R$^4$ are each independently hydrogen, methyl, methoxy, fluorine or trifluoromethyl; and
R$^5$ is —CH$_2$CH$_2$— or a divalent phenyl radical.

* * * * *

UNITED STATES PATENT AND TRADEMARK OFFICE
CERTIFICATE OF CORRECTION

PATENT NO. : 4,828,941
DATED : May 9, 1989
INVENTOR(S) : HANS-JOSEF STERZEL

It is certified that error appears in the above-identified patent and that said Letters Patent is hereby corrected as shown below:

On the title page, item [30]:

Please add the following Priority Data:

--Jun. 4, 1986 [DE] Fed. Rep of Germany ....... 3618840--

Signed and Sealed this

Twenty-sixth Day of December, 1989

Attest:

JEFFREY M. SAMUELS

Attesting Officer    Acting Commissioner of Patents and Trademarks